United States Patent
Okada et al.

(10) Patent No.: US 8,075,836 B2
(45) Date of Patent: Dec. 13, 2011

(54) STEEL-SHEET CONTINUOUS ANNEALING EQUIPMENT AND METHOD FOR OPERATING STEEL-SHEET CONTINUOUS ANNEALING EQUIPMENT

(75) Inventors: Rie Okada, Kakogawa (JP); Shinobu Nakayama, Kakogawa (JP); Toshio Murakami, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 12/710,021

(22) Filed: Feb. 22, 2010

(65) Prior Publication Data

US 2010/0237548 A1 Sep. 23, 2010

(30) Foreign Application Priority Data

Mar. 23, 2009 (JP) ................................ 2009-070532

(51) Int. Cl.
*C21D 6/00* (2006.01)
(52) U.S. Cl. ............. 266/44; 266/252; 266/99; 266/259
(58) Field of Classification Search ................... 266/44, 266/259, 99, 252
See application file for complete search history.

(56) References Cited

U.S. PATENT DOCUMENTS

| | | | | |
|---|---|---|---|---|
| 3,805,571 A | * | 4/1974 | Toda et al. ....................... | 72/202 |
| 4,363,471 A | * | 12/1982 | Yanagishima et al. ......... | 266/111 |
| 4,373,706 A | * | 2/1983 | Elhaus et al. .................. | 266/252 |
| 4,898,626 A | * | 2/1990 | Shoen et al. ................... | 148/111 |
| 5,137,586 A | * | 8/1992 | Klink .............................. | 148/529 |
| 5,885,382 A | * | 3/1999 | Sakurai et al. ................. | 148/661 |
| 6,913,659 B2 | * | 7/2005 | Oogushi et al. ............... | 148/661 |
| 7,381,364 B2 | * | 6/2008 | Yamashita .................... | 266/113 |

FOREIGN PATENT DOCUMENTS

JP 2008-297592 12/2008

* cited by examiner

*Primary Examiner* — Scott Kastler
*Assistant Examiner* — Michael Aboagye
(74) *Attorney, Agent, or Firm* — Oblon, Spivak, McClelland, Maier & Neustadt, L.L.P.

(57) ABSTRACT

Steel-sheet continuous annealing equipment includes, in sequence, a pre-heating zone, a heating zone, a soaking zone, a cooling zone, a reheating zone, an overaging zone, and a final cooling zone, and further includes a rapid heating region and a rapid cooling region that are provided within a range from the reheating zone to the final cooling zone (including the reheating zone and the final cooling zone), the rapid heating region allowing rapid heating of a steel sheet at a heating rate of 15° C./s or more and the rapid cooling region allowing rapid cooling, at a cooling rate of 10° C./s or more, of the steel sheet that has been rapidly heated in the rapid heating region. Various steel-sheet products ranging from mild steel sheets to ultrahigh-tensile steel sheets can be produced by performing a heat treatment with such steel-sheet continuous annealing equipment.

10 Claims, 8 Drawing Sheets

STEEL-SHEET CONTINUOUS ANNEALING EQUIPMENT AND METHOD FOR OPERATING STEEL-SHEET CONTINUOUS ANNEALING EQUIPMENT

BACKGROUND OF THE INVENTION

1. Field of the Invention

The present invention relates to steel-sheet continuous annealing equipment and a method for operating such steel-sheet continuous annealing equipment.

2. Description of the Related Art

To enhance the processability of cold-rolled steel sheets, cold-rolled steel sheets are heat-treated with a continuous annealing furnace having, in sequence, a heating zone, a soaking zone, first and second cooling zones, a reheating zone, an overaging zone, and a final cooling zone.

When mild steel sheets or common high-tensile steel sheets are produced by performing a heat treatment with continuous annealing equipment, the time for which steel sheets are held at a temperature after being reheated is 100 seconds or more. Stated another way, after being reheated, steel sheets are held at the temperature for 100 seconds or more.

High-tensile steel products have been demanded to have better characteristics (higher strength, higher elongation, and higher $\lambda$) year after year. With this trend, methods for producing high-tensile steel products have become complicated.

For example, as disclosed in Japanese Unexamined Patent Application Publication No. 2008-297592, steel sheets that are used for producing lower weight automobiles or the like and have high strength, high elongation, and a high hole-expansion ratio such as high-tensile steel sheets having a strength of 1,000 MPa, an elongation of 10%, and a hole-expansion ratio of 100% are produced with an additional step such as pre-annealing of steel sheets or addition of a constraint on the coiling temperature in hot rolling. However, such an additional step of pre-annealing steel sheets increases the cost of the production process. To decrease the coiling temperature, strong cooling is necessary and there are many technical requirements to be met to realize practical use, for example, prevention of deformation of steel sheets and achievement of a uniform temperature distribution during coiling of the steel sheets.

SUMMARY OF THE INVENTION

To overcome such problems, studies have been conducted. As a result, it has been found that ultrahigh-tensile steel sheets having a strength of 1,000 MPa, an elongation of 10%, and a hole-expansion ratio of 100% can be produced in the following manner. After steel sheets are subjected to soaking in the soaking zone and subsequent cooling (second cooling) in the cooling zone, the steel sheets are subjected to rapid heating at a heating rate of 15° C./s or more and subsequently rapid cooling at a cooling rate of 10° C./s or more. In particular, it has also been found that the rapid cooling of the steel sheets is preferably initiated within 30 seconds after completion of the rapid heating of the steel sheets.

However, production of such ultrahigh-tensile steel sheets by performing the above-described heat treatment with a continuous annealing line having a conventional configuration (conventional steel-sheet continuous annealing equipment) presents the following problems.

For example, when a high-tensile steel sheet having a single-phase structure composed of tempered-martensite or a two-phase structure composed of ferrite and tempered-martensite is produced, to decrease the hardness of martensite upon tempering, the heating temperature in the reheating zone is increased; and, to reduce the size of cementite grains in tempered-martensite, the heating temperature is increased, the dwelling time (holding time) of the steel sheet at about the maximum temperature is decreased, and the resultant steel sheet is rapidly cooled. However, conventional steel-sheet continuous annealing lines are designed so as to have a line length providing an overaging time of more than 100 seconds. Accordingly, when conventional steel-sheet continuous annealing lines are used, the holding time of steel sheets after being heated in the reheating zone becomes too long and hence the desired steel structure is not provided.

Thus, to satisfy the above-described heat-pattern conditions, a line designed specifically for the conditions is generally required. It is not impossible to satisfy the above-described heat-pattern conditions with conventional steel-sheet continuous annealing equipment without providing a line designed specifically for the conditions. However, in such a case, steel sheets are treated twice to satisfy the above-described heat-pattern conditions.

In summary, it is considerably difficult to produce various steel-sheet products ranging from mild steel sheets to ultrahigh-tensile steel sheets by performing a heat treatment only with conventional steel-sheet continuous annealing equipment.

Accordingly, it is an object of the present invention to provide steel-sheet continuous annealing equipment with which various steel-sheet products ranging from mild steel sheets to ultrahigh-tensile steel sheets can be produced by performing a heat treatment; and a method for operating such steel-sheet continuous annealing equipment.

The inventors of the present invention have performed thorough studies on how to achieve the above-described object. As a result, they have achieved the present invention. An embodiment (first embodiment) satisfying the above-described object according to the present invention is steel-sheet continuous annealing equipment including, in sequence, a pre-heating zone, a heating zone, a soaking zone, a cooling zone, a reheating zone, an overaging zone, and a final cooling zone, and further including a rapid heating region and a rapid cooling region that are provided within a range from the reheating zone to the final cooling zone, the rapid heating region allowing rapid heating of a steel sheet at a heating rate of 15° C./s or more and the rapid cooling region allowing rapid cooling, at a cooling rate of 10° C./s or more, of the steel sheet that has been rapidly heated in the rapid heating region. As described "within a range from the reheating zone to the final cooling zone", the first embodiment encompasses a case where the rapid heating region is provided in the reheating zone and a case where the rapid heating region is provided in the final cooling zone.

In the steel-sheet continuous annealing equipment according to the first embodiment, the rapid heating region may be provided in the overaging zone and the rapid cooling region may be provided between the overaging zone and the final cooling zone or in the final cooling zone.

In the steel-sheet continuous annealing equipment according to the first embodiment, the rapid heating region may be provided in the reheating zone and the rapid cooling region may be provided between the reheating zone and the overaging zone.

In the steel-sheet continuous annealing equipment according to the first embodiment, both the rapid heating region and the rapid cooling region may be provided in the overaging zone.

The steel-sheet continuous annealing equipment according to the first embodiment may further include means for measuring temperatures of the steel sheet before and after the rapid heating region and after the rapid cooling in the rapid cooling region.

In the steel-sheet continuous annealing equipment according to the first embodiment, the rapid heating region may include a plurality of heating units whose heating capabilities are independently controllable.

In the steel-sheet continuous annealing equipment according to the first embodiment, the rapid cooling region may include a plurality of cooling units whose cooling capabilities are independently controllable.

In the steel-sheet continuous annealing equipment according to the first embodiment, means for heating the steel sheet in the rapid heating region may include an induction heater or heating means configured to conduct indirect heating.

In the steel-sheet continuous annealing equipment according to the first embodiment, means for cooling the steel sheet in the rapid cooling region may include a gas-jet cooling device configured to cool the steel sheet by blowing cooling gas on the steel sheet through a nozzle.

In the steel-sheet continuous annealing equipment according to the first embodiment, a gas mixture containing nitrogen and hydrogen and having a hydrogen concentration of 5 to 75 vol % may be used as cooling gas in the rapid cooling region.

In the steel-sheet continuous annealing equipment according to the first embodiment, the rapid heating region and the rapid cooling region may be connected to each other through a duct in which a fan is disposed in an intermediate portion of the duct so as to allow exchange of atmosphere gases.

A method for operating steel-sheet continuous annealing equipment according to an embodiment of the present invention is a method for operating the steel-sheet continuous annealing equipment according to the first embodiment, wherein the rapid cooling of the steel sheet in the rapid cooling region is initiated within 30 seconds after completion of the rapid heating of the steel sheet in the rapid heating region.

In a method for operating the steel-sheet continuous annealing equipment including the plurality of heating units whose heating capabilities are independently controllable, the heating capability of each heating unit may be controlled on the basis of a temperature of the steel sheet before being rapidly heated in the rapid heating region, a target temperature of the steel sheet at delivery side of the rapid heating region, a size of the steel sheet, a travelling speed of the steel sheet, and the heating rate of the rapid heating in the rapid heating region.

In a method for operating the steel-sheet continuous annealing equipment including the plurality of cooling units whose cooling capabilities are independently controllable, the cooling capability of each cooling unit may be controlled on the basis of a temperature of the steel sheet at entry side of the rapid cooling region, a target temperature of the steel sheet at delivery side of the rapid cooling region, a size of the steel sheet, and a travelling speed of the steel sheet.

Various steel-sheet products ranging from mild steel sheets to ultrahigh-tensile steel sheets can be produced by performing a heat treatment with steel-sheet continuous annealing equipment according to the present invention. Various steel-sheet products ranging from mild steel sheets to ultrahigh-tensile steel sheets can be produced by performing a heat treatment by a method for operating steel-sheet continuous annealing equipment according to the present invention.

DESCRIPTION OF THE PREFERRED EMBODIMENTS

Figure 1:
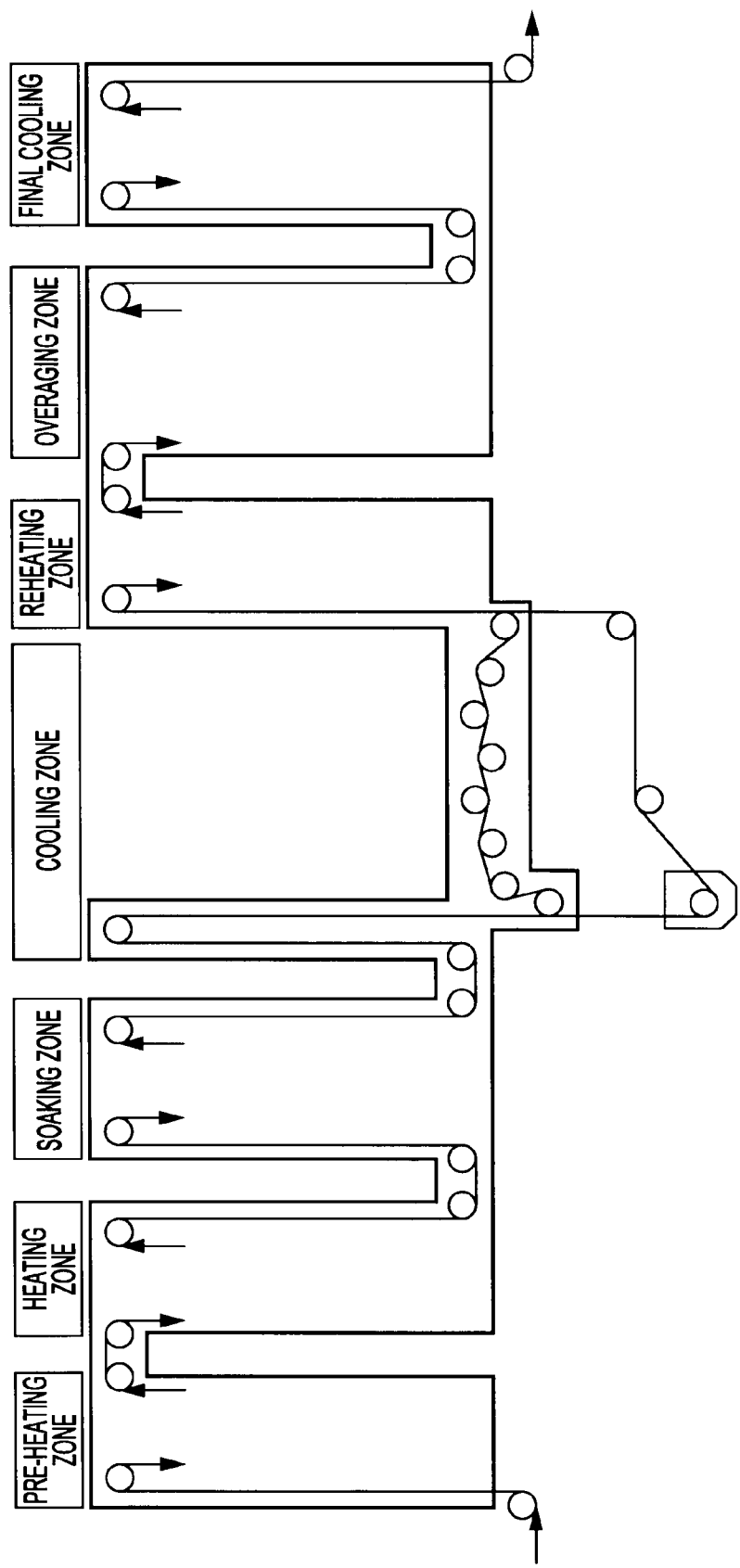
FIG. 1 is a schematic view of conventional steel-sheet continuous annealing equipment.

As described above, steel-sheet continuous annealing equipment according to the present invention includes, in sequence, a pre-heating zone, a heating zone, a soaking zone, a cooling zone, a reheating zone, an overaging zone, and a final cooling zone, and further includes a rapid heating region and a rapid cooling region that are provided within a range from the reheating zone to the final cooling zone (including the reheating zone and the final cooling zone), the rapid heating region allowing rapid heating of a steel sheet at a heating rate of 15° C./s or more and the rapid cooling region allowing rapid cooling, at a cooling rate of 10° C./s or more, of the steel sheet that has been rapidly heated in the rapid heating region. With such equipment, a steel sheet after having been cooled in the cooling zone can be rapidly heated at a heating rate of 15° C./s or more and then rapidly cooled at a cooling rate of 10° C./s or more. Accordingly, even ultrahigh-tensile steel sheets can be produced by performing a heat treatment and hence various steel-sheet products ranging from mild steel sheets to ultrahigh-tensile steel sheets can be produced by performing a heat treatment.

Specifically, for example, when a high-tensile steel sheet having a single-phase structure composed of tempered-martensite or a two-phase structure composed of ferrite and tempered-martensite is produced, such a steel-sheet structure can be provided by the following heat treatment. After a steel sheet is cooled in the cooling zone, the steel sheet is held without being heated or at a low temperature (for example, 250° C.). The steel sheet is then rapidly heated in the rapid heating region at a heating rate of 15° C./s or more to a high temperature (for example, 550° C.). After this rapid heating is complete, rapid cooling of the steel sheet in the rapid cooling region is initiated within 30 seconds. This rapid cooling is conducted by rapidly cooling the steel sheet in the rapid cooling region at a cooling rate of 10° C./s or more to a low temperature (for example, 200° C.). Thus, results shown in Table 2 below are provided.

According to an embodiment of the present invention, the rapid heating region is at least configured to conduct heating at an average heating rate of 15° C./s or more in the temperature range of 250° C. to 550° C. According to an embodiment of the present invention, the rapid cooling region is at least configured to conduct cooling at an average cooling rate of 10° C./s or more in the temperature range of 550° C. to 200° C.

Steel-sheet continuous annealing equipment according to the present invention includes a rapid heating region and a rapid cooling region that are provided within a range from the reheating zone to the final cooling zone (including the reheating zone and the final cooling zone). As long as this condition is satisfied, the positions where the rapid heating region and the rapid cooling region are provided are not particularly restricted and various positional configurations may be employed. For example, the rapid heating region may be provided in the overaging zone and the rapid cooling region may be provided between the overaging zone and the final cooling zone or in the final cooling zone. Alternatively, the rapid heating region may be provided in the reheating zone and the rapid cooling region may be provided between the reheating zone and the overaging zone. Alternatively, both the rapid heating region and the rapid cooling region may be provided in the overaging zone. According to an embodiment of the present invention, steel-sheet continuous annealing equipment includes a rapid heating region provided in the overaging zone and a rapid cooling region provided in the final cooling zone. In this case, the entire overaging zone may be configured to function as the rapid heating region and the entire final cooling zone may be configured to function as the rapid cooling region. When the rapid heating region is provided in the reheating zone, the entire reheating zone may be configured to function as the rapid heating region. When both the rapid heating region and the rapid cooling region are provided in the overaging zone, the entire overaging zone may be configured to function as the rapid heating region and the rapid cooling region.

When the rapid heating region is provided in the reheating zone and the rapid cooling region is provided between the reheating zone and the overaging zone, there is no cooling means in the overaging zone and hence mild steel sheets and common high-tensile steel sheets can be subjected to continuous annealing without wasting heat, which is advantageous.

When means for measuring the temperatures of a steel sheet before and after the rapid heating region and after rapid cooling in the rapid cooling region is provided, the temperatures of the steel sheet can be measured before and after the rapid heating region and after rapid cooling in the rapid cooling region. As a result, conditions such as the rapid heating rate and the rapid cooling rate can be controlled with more certainty and material characteristics of the resultant steel sheet can be stabilized.

In steel-sheet continuous annealing equipment according to an embodiment of the present invention, the rapid heating region may include a plurality of heating units whose heating capabilities are independently controllable. In this case, the rapid heating rate can be controlled with more certainty and, as a result, material characteristics of the resultant steel sheet can be stabilized.

The rapid cooling region may include a plurality of cooling units whose cooling capabilities are independently controllable. In this case, the rapid cooling can be controlled with more certainty and, as a result, material characteristics of the resultant steel sheet can be stabilized.

In steel-sheet continuous annealing equipment according to an embodiment of the present invention, means for heating a steel sheet in the rapid heating region may include an induction heater or heating means configured to conduct indirect heating. Indirect heating is conducted by heating a steel sheet with combustion gas while the steel sheet is not in contact with the combustion gas. For example, tubes that are placed in a furnace and configured to generate heat therein with electric power, fuel combustion, or the like are used to radiate heat from the outer surfaces of the tubes to thereby heat a steel sheet.

Means for cooling a steel sheet in the rapid cooling region may include a gas-jet cooling device configured to cool the steel sheet by blowing cooling gas on the steel sheet through a nozzle.

A cooling gas used in the rapid cooling region may be a nitrogen-hydrogen gas mixture having a hydrogen concentration of 5 to 75 vol % (a gas mixture that contains nitrogen and hydrogen and has a hydrogen concentration of 5 to 75 vol %). In particular, when a steel sheet having a thickness (for example, 2 mm or more) that requires a relatively high cooling capability is produced, a nitrogen-hydrogen gas mixture having a hydrogen concentration of 50 to 75 vol % is desirably used.

The rapid heating region and the rapid cooling region may be connected to each other through a duct in which a fan is disposed in an intermediate portion of the duct so as to allow exchange of atmosphere gases. In this case, atmosphere gases can be readily exchanged, which is advantageous. In particular, such a configuration facilitates exchange of atmosphere gases, which is necessary in switching from continuous annealing for an ultrahigh-tensile steel sheet or a high-tensile steel sheet to continuous annealing for a mild steel sheet or an ordinary steel sheet; and in switching from continuous annealing for a mild steel sheet or an ordinary steel sheet to continuous annealing for an ultrahigh-tensile steel sheet or a high-tensile steel sheet.

When steel-sheet continuous annealing equipment according to the present invention is operated so that rapid cooling of a steel sheet in the rapid cooling region is initiated within 30 seconds after completion of rapid heating of the steel sheet in the rapid heating region, the steel sheet is heat-treated to be thereby given a structure required for a high-tensile steel sheet or an ultrahigh-tensile steel sheet with more certainty. In this way, to initiate rapid cooling of a steel sheet in the rapid cooling region within 30 seconds after completion of rapid heating of the steel sheet in the rapid heating region, when the inter-region travelling distance between the rapid heating region and the rapid cooling region is defined as L (m) and the line speed (the travelling speed of a steel sheet) is defined as S (m/min), $L=(S/2)$ m or less should be satisfied. When the value of L is fixed, a minimum line speed should be employed as S. Stated another way, when the minimum line speed is defined as $S_{min}$, a value of L that satisfies $L=(S_{min}/2)$ m or less should be employed. Note that the term "inter-region travelling distance between the rapid heating region and the rapid cooling region" is the distance from a position (in the rapid heating region) where rapid heating is complete to the entrance of the rapid cooling region.

When steel-sheet continuous annealing equipment including a plurality of heating units whose heating capabilities are independently controllable according to the present invention is operated, the heating capability of each heating unit is desirably controlled on the basis of the temperature of a steel sheet before being rapidly heated in the rapid heating region, the target temperature of the steel sheet at delivery side of the rapid heating region, the size of the steel sheet, the travelling speed of the steel sheet, and the heating rate of the rapid heating in the rapid heating region. In this case, the rapid heating rate can be controlled with more certainty and, as a result, material characteristics of the resultant steel sheet can be stabilized.

When steel-sheet continuous annealing equipment including a plurality of cooling units whose cooling capabilities are independently controllable according to the present invention is operated, the cooling capability of each cooling unit is desirably controlled on the basis of the temperature of a steel sheet at entry side of the rapid cooling region, the target temperature of the steel sheet at delivery side of the rapid cooling region, the size of the steel sheet, and the travelling speed of the steel sheet. In this case, the rapid cooling can be controlled with more certainty and, as a result, material characteristics of the resultant steel sheet can be stabilized.

FIG. 1 illustrates conventional steel-sheet continuous annealing equipment including, in sequence, a pre-heating zone, a heating zone, a soaking zone, a cooling zone, a reheating zone, an overaging zone, and a final cooling zone.

Figure 2:
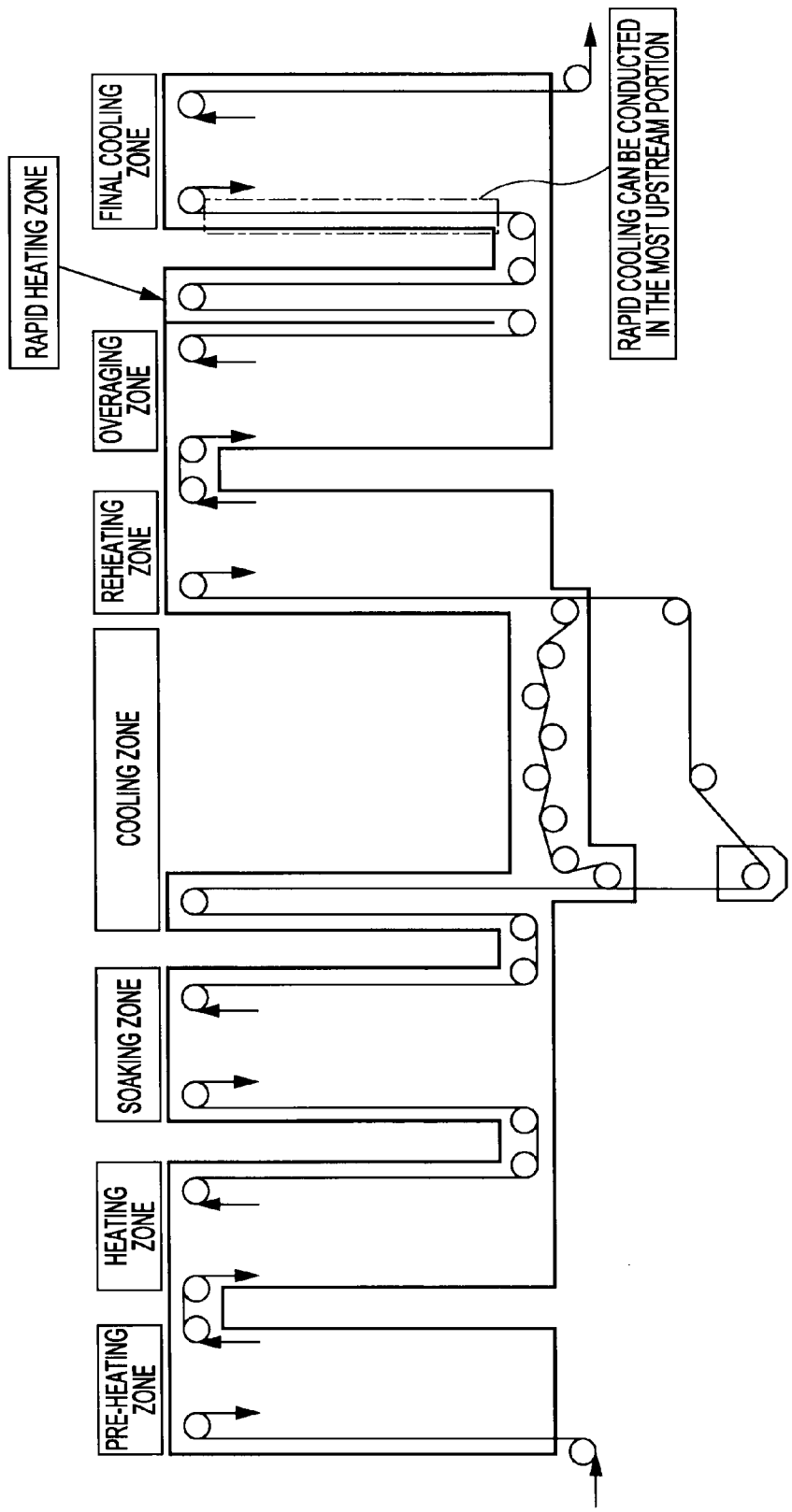
FIG. 2 is a schematic view of steel-sheet continuous annealing equipment according to an embodiment of the present invention.
Figure 3:
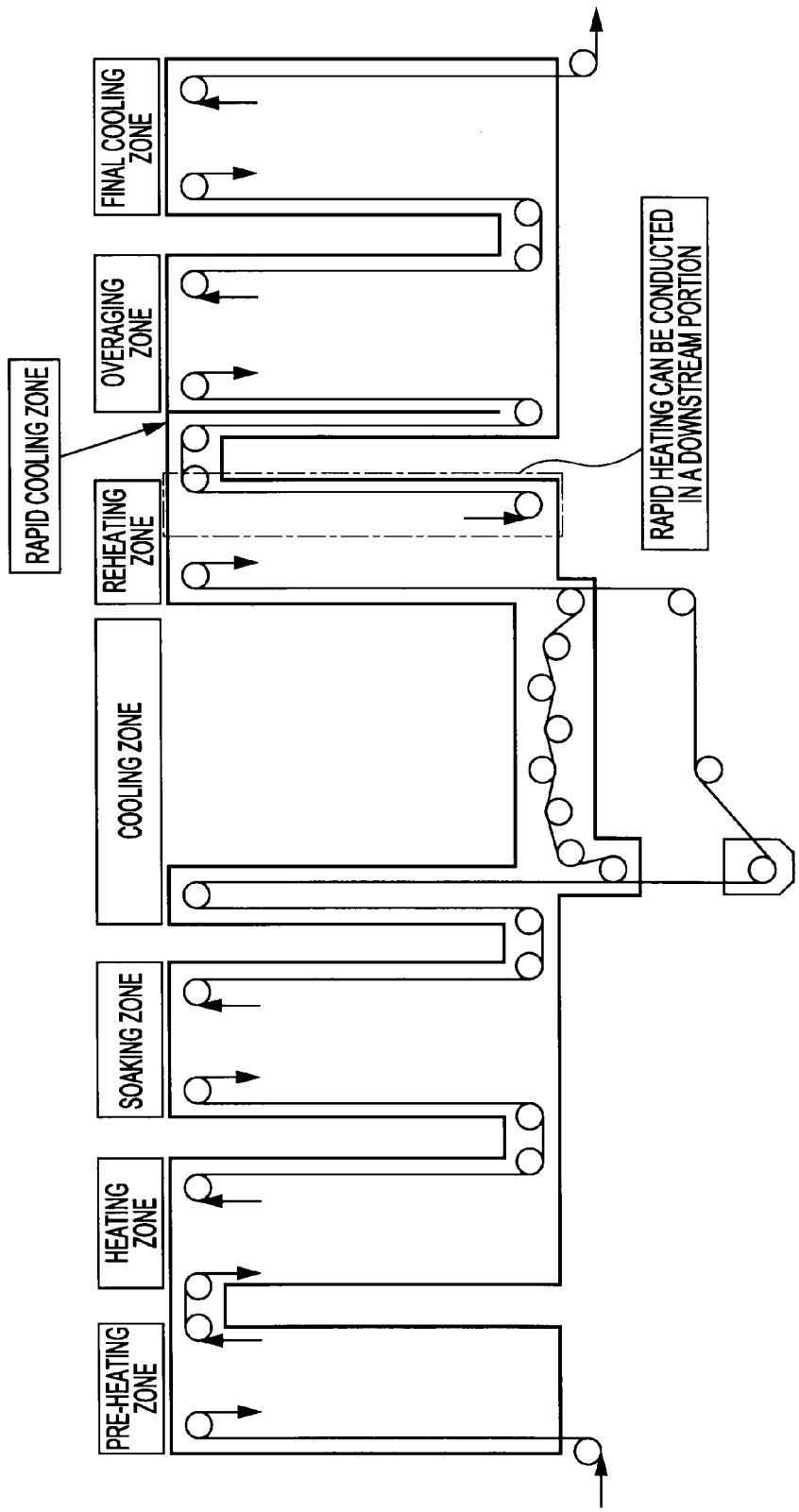
FIG. 3 is a schematic view of steel-sheet continuous annealing equipment according to another embodiment of the present invention.
Figure 4:
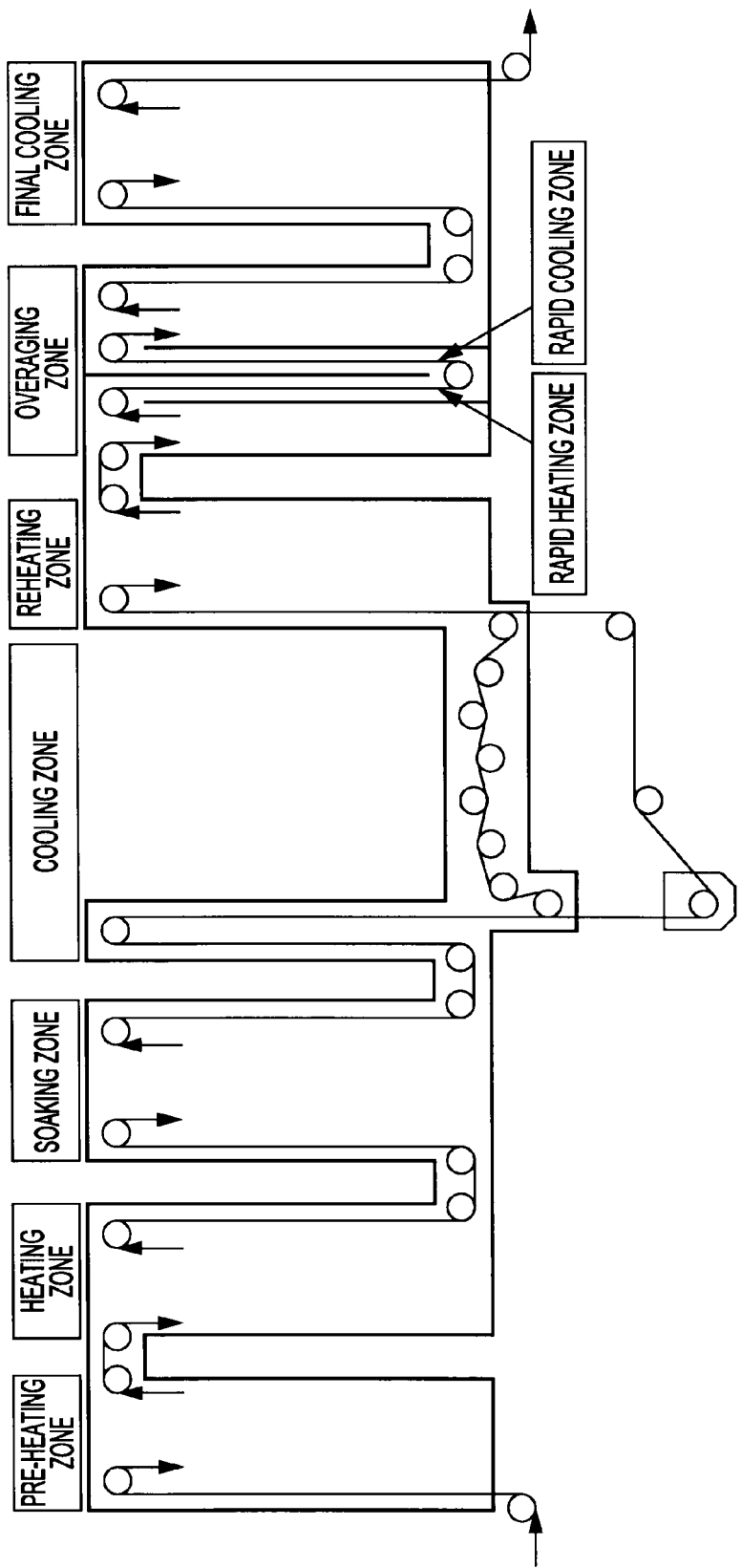
FIG. 4 is a schematic view of steel-sheet continuous annealing equipment according to another embodiment of the present invention.

FIGS. 2 to 4 illustrate steel-sheet continuous annealing equipment according to embodiments of the present invention. The steel-sheet continuous annealing equipment includes, in sequence, a pre-heating zone, a heating zone, a soaking zone, a cooling zone, a reheating zone, an overaging zone, and a final cooling zone, and further includes a rapid heating region (referred to as "rapid heating zone" in the figures) and a rapid cooling region (referred to as "rapid cooling zone" in the figures) that are provided within a range from the reheating zone to the final cooling zone (including the reheating zone and the final cooling zone). The rapid heating region allows rapid heating of a steel sheet at a heating rate of 15° C./s or more. The rapid cooling region allows rapid cooling, at a cooling rate of 10° C./s or more, of the steel sheet that has been rapidly heated in the rapid heating region. Note that the positional configuration of the rapid heating region and the rapid cooling region varies among these embodiments. Specifically, in the embodiment illustrated in FIG. 2, the rapid heating region is provided in the overaging zone and the rapid cooling region is provided in the final cooling zone. In the embodiment illustrated in FIG. 3, the rapid heating region is provided in the reheating zone and the rapid cooling region is provided between the reheating zone and the overaging zone. In the embodiment illustrated in FIG. 4, both the rapid heating region and the rapid cooling region are provided in the overaging zone.

Figure 5:
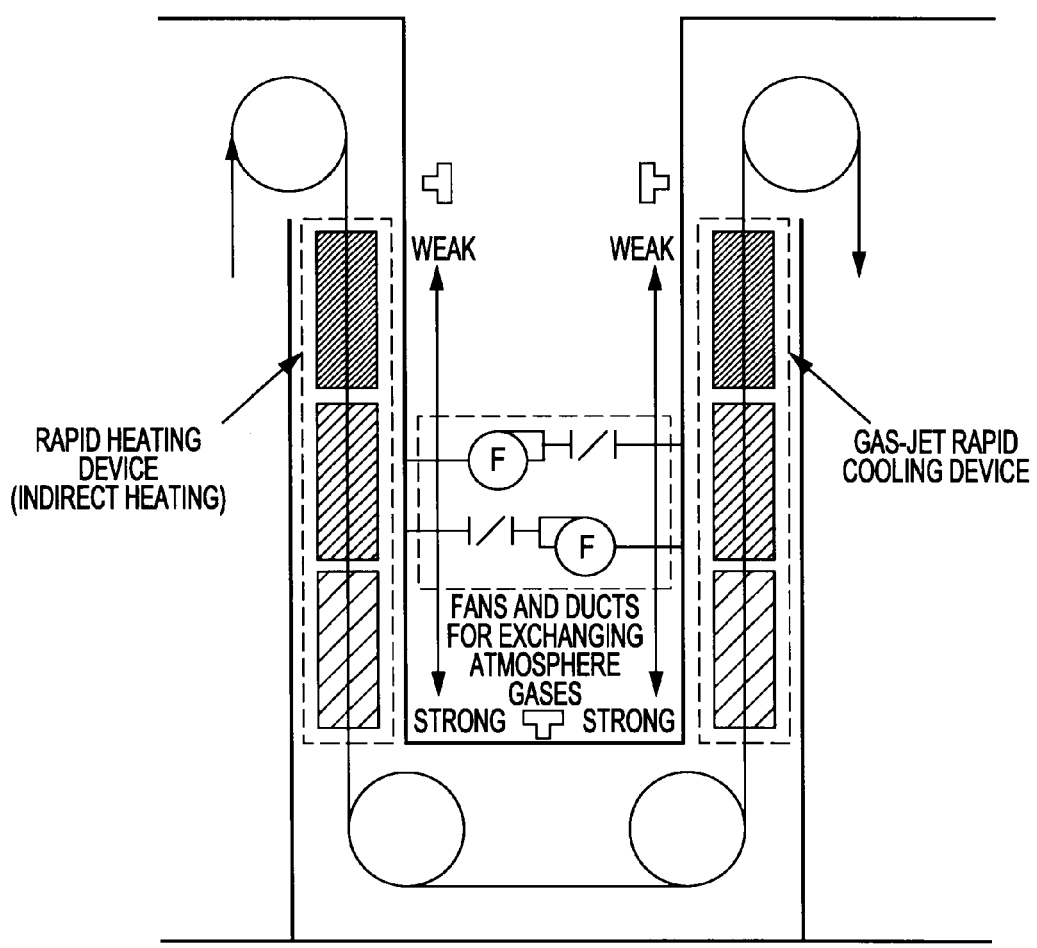
FIG. 5 is a schematic view of an example of the configuration of a rapid heating region and a rapid cooling region in steel-sheet continuous annealing equipment according to the present invention.

FIG. 5 illustrates an example of the configuration of a rapid heating region and a rapid cooling region in steel-sheet continuous annealing equipment according to the present invention. This equipment includes means for measuring the temperatures of a steel sheet before and after the rapid heating region and means for measuring the temperature of the steel sheet after rapid cooling in the rapid cooling region. The rapid heating region includes a plurality of (three) heating units whose heating capabilities are independently controllable. The rapid cooling region includes a plurality of (three) cooling units whose cooling capabilities are independently controllable. The rapid heating region includes, as heating means, heating means configured to conduct indirect heating. The rapid cooling region includes, as cooling Means, a gas-jet cooling device configured to cool the steel sheet by blowing cooling gas on the steel sheet through a nozzle. The rapid heating region and the rapid cooling region are connected to each other through ducts in which fans are disposed in intermediate portions of the ducts so as to allow exchange of atmosphere gases.

EXAMPLES

Hereinafter, examples according to the present invention and comparative examples will be described. However, the present invention is not restricted to these examples and variations and modifications may be effected within the spirit and scope of the present invention. All such variations and modifications are embraced within the technical scope of the present invention.

Example 1

A mild steel sheet, a high-tensile steel sheet, and an ultra-high-tensile steel sheet were produced by performing continuous annealing with steel-sheet continuous annealing equipment (including a rapid heating region provided in an overaging zone and a rapid cooling region provided in a final cooling zone) illustrated in FIG. 2 according to an embodiment of the present invention. While the mild steel sheet and the high-tensile steel sheet were produced by performing continuous annealing, the rapid heating means of the rapid heating region and the rapid cooling means of the rapid cooling region were turned off (rapid heating was not conducted in the rapid heating region and rapid cooling was not conducted in the rapid cooling region). While the ultrahigh-tensile steel sheet was produced by performing continuous annealing, the rapid heating means of the rapid heating region and the rapid cooling means of the rapid cooling region were turned on (rapid heating was conducted in the rapid heating region and rapid cooling was conducted in the rapid cooling region). The configuration of the rapid heating region and the rapid cooling region in the steel-sheet continuous annealing equipment was the same as that illustrated in FIG. 5.

Figure 6:
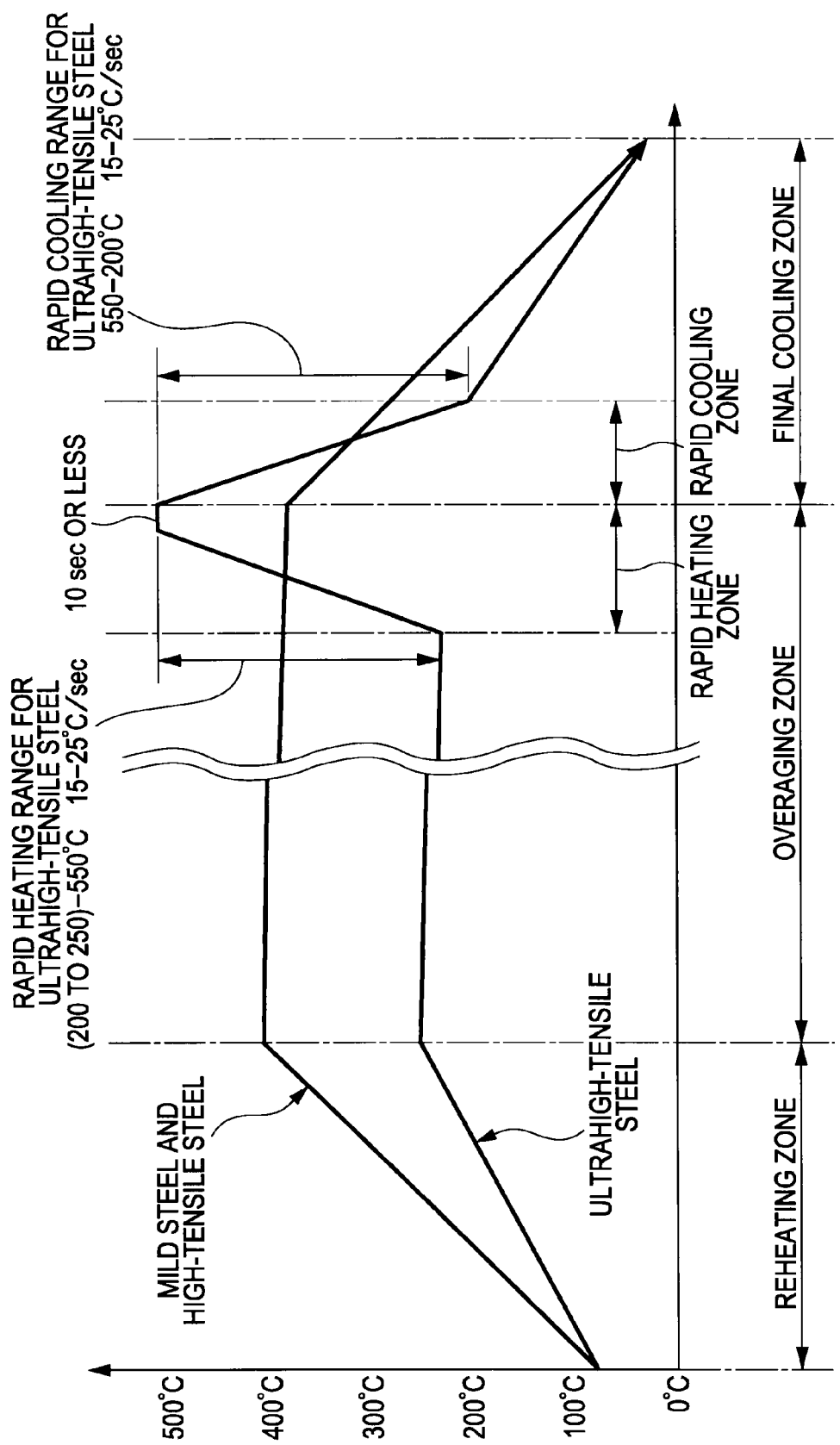
FIG. 6 illustrates an example of heating patterns for steel sheets when the steel sheets are continuously annealed with steel-sheet continuous annealing equipment according to an embodiment of the present invention.

FIG. 6 illustrates heating patterns for steel sheets from the reheating zone to the final cooling zone during the above-described continuous annealing. As illustrated in FIG. 6, the ultrahigh-tensile steel sheet was continuously annealed in which rapid heating was conducted at a heating rate of 15° C./s to 25° C./s and rapid cooling was subsequently conducted at a cooling rate of 15° C./s to 25° C./s. After the rapid heating was complete, the steel sheet was held at a constant temperature (550° C.) within 10 seconds without being rapidly heated or rapidly cooled. That is, after the rapid heating was complete, the rapid cooling was initiated in the rapid cooling region within 10 seconds. This heating pattern satisfies conditions necessary for producing an ultrahigh-tensile steel sheet. Since rapid heating in the rapid heating region and rapid cooling in the rapid cooling region were not conducted for producing the mild steel sheet, the mild steel sheet was produced by performing continuous annealing according to the other heating pattern illustrated in FIG. 6. This heating pattern satisfies conditions necessary for producing a mild steel sheet by performing continuous annealing.

Thus, it has been demonstrated that steel-sheet products ranging from mild steel sheets to ultrahigh-tensile steel sheets can be produced by performing a heat treatment with the steel-sheet continuous annealing equipment illustrated in FIG. 2 according to an embodiment of the present invention.

Example 2

A mild steel sheet, a high-tensile steel sheet, and an ultra-high-tensile steel sheet were produced by performing continuous annealing with steel-sheet continuous annealing equipment (including a rapid heating region provided in a reheating zone and a rapid cooling region provided in an overaging zone) according to an embodiment of the present invention. Other than some respects, this equipment had the same configuration as the steel-sheet continuous annealing equipment (including a rapid heating region provided in a reheating zone and a rapid cooling region provided between the reheating zone and an overaging zone) illustrated in FIG. 3. While the mild steel sheet and the high-tensile steel sheet were produced by performing continuous annealing, the rapid heating means of the rapid heating region and the rapid cooling means of the rapid cooling region were turned off (rapid heating was not conducted in the rapid heating region and rapid cooling was not conducted in the rapid cooling region). While the ultrahigh-tensile steel sheet was produced by performing continuous annealing, the rapid heating means of the rapid heating region and the rapid cooling means of the rapid cooling region were turned on (rapid heating was conducted in the rapid heating region and rapid cooling was conducted in the rapid cooling region). The configuration of the rapid heating region and the rapid cooling region in the steel-sheet continuous annealing equipment was the same as that illustrated in FIG. 5.

Figure 7:
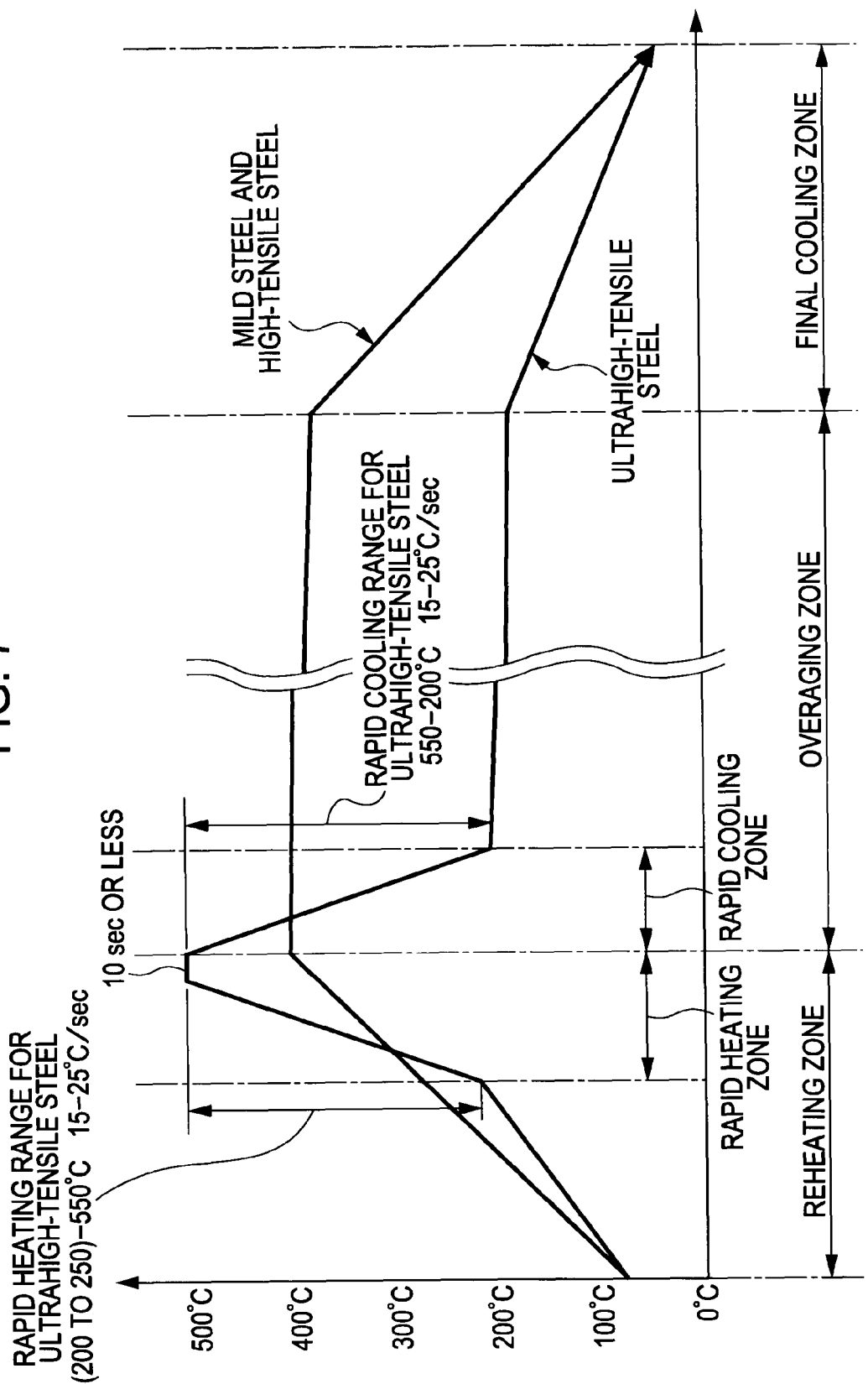
FIG. 7 illustrates an example of heating patterns for steel sheets when the steel sheets are continuously annealed with steel-sheet continuous annealing equipment according to another embodiment of the present invention.

FIG. 7 illustrates heating patterns for steel sheets from the reheating zone to the final cooling zone during the above-described continuous annealing. As illustrated in FIG. 7, the ultrahigh-tensile steel sheet was produced by performing continuous annealing in which rapid heating was conducted at a heating rate of 15° C./s to 25° C./s and rapid cooling was subsequently conducted at a cooling rate of 15° C./s to 25° C./s. After the rapid heating was complete, the steel sheet was held at a constant temperature (550° C.) within 10 seconds without being rapidly heated or rapidly cooled. That is, after the rapid heating was complete, the rapid cooling was initiated in the rapid cooling region within 10 seconds. This heating pattern satisfies conditions necessary for producing an ultrahigh-tensile steel sheet by performing continuous annealing. Since rapid heating in the rapid heating region and rapid cooling in the rapid cooling region were not conducted for producing the mild steel sheet during continuous annealing, the mild steel sheet was produced by performing continuous annealing according to the other heating pattern illustrated in FIG. 7. This heating pattern satisfies conditions necessary for producing a mild steel sheet by performing continuous annealing.

Thus, it has been demonstrated that steel-sheet products ranging from mild steel sheets to ultrahigh-tensile steel sheets can be produced by performing a heat treatment with the above-described steel-sheet continuous annealing equipment according to an embodiment of the present invention.

Example 3

A mild steel sheet, a high-tensile steel sheet, and an ultrahigh-tensile steel sheet were produced by performing continuous annealing with steel-sheet continuous annealing equipment (including both a rapid heating region and a rapid cooling region that were provided in an overaging zone) illustrated in FIG. 4 according to an embodiment of the present invention. While the mild steel sheet and the high-tensile steel sheet were produced by performing continuous annealing, the rapid heating means of the rapid heating region and the rapid cooling means of the rapid cooling region were turned off (rapid heating was not conducted in the rapid heating region and rapid cooling was not conducted in the rapid cooling region). While the ultrahigh-tensile steel sheet was produced by performing continuous annealing, the rapid heating means of the rapid heating region and the rapid cooling means of the rapid cooling region were turned on (rapid heating was conducted in the rapid heating region and rapid cooling was conducted in the rapid cooling region). The configuration of the rapid heating region and the rapid cooling region in the steel-sheet continuous annealing equipment was the same as that illustrated in FIG. 5.

Figure 8:
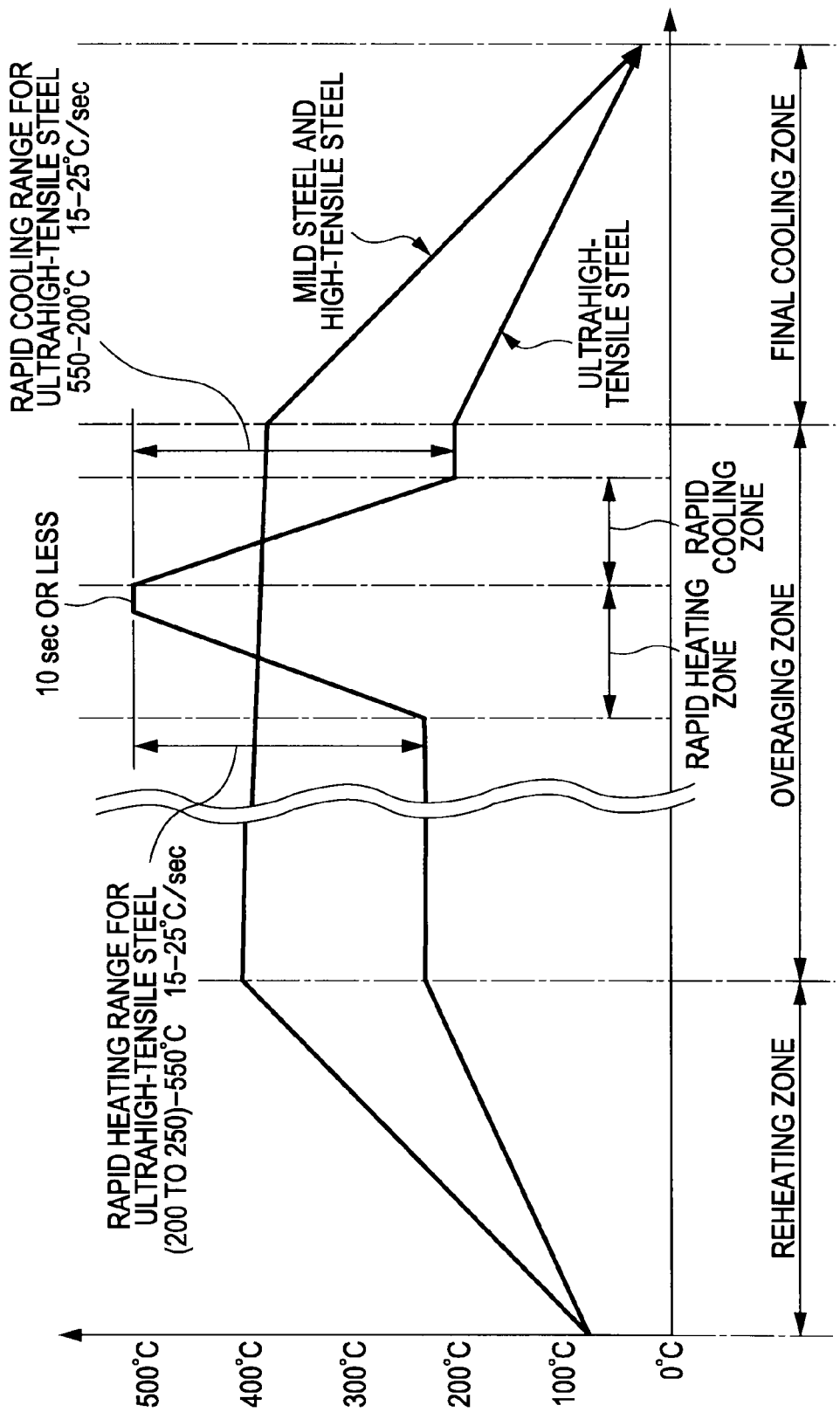
FIG. 8 illustrates an example of heating patterns for steel sheets when the steel sheets are continuously annealed with steel-sheet continuous annealing equipment according to another embodiment of the present invention.

FIG. 8 illustrates heating patterns for steel sheets from the reheating zone to the final cooling zone during the above-described continuous annealing. As illustrated in FIG. 8, the ultrahigh-tensile steel sheet was produced by performing continuous annealing in which rapid heating was conducted at a heating rate of 15° C./s to 25° C./s and rapid cooling was subsequently conducted at a cooling rate of 15° C./s to 25° C./s. After the rapid heating was complete, the steel sheet was held at a constant temperature (550° C.) within 10 seconds without being rapidly heated or rapidly cooled. That is, after the rapid heating was complete, the rapid cooling was initiated in the rapid cooling region within 10 seconds. This heating pattern satisfies conditions necessary for producing an ultrahigh-tensile steel sheet by performing continuous annealing. Since rapid heating in the rapid heating region and rapid cooling in the rapid cooling region were not conducted for producing the mild steel sheet during continuous annealing, the mild steel sheet was produced by performing continuous annealing according to the other heating pattern illustrated in FIG. 8. This heating pattern satisfies conditions necessary for producing a mild steel sheet by performing continuous annealing.

Thus, it has been demonstrated that steel-sheet products ranging from mild steel sheets to ultrahigh-tensile steel sheets can be produced by performing a heat treatment with the steel-sheet continuous annealing equipment illustrated in FIG. 4 according to an embodiment of the present invention.

Example 4

Cold-rolled steel sheets (steel types: A and B) having compositions shown in Table 1 below were continuously annealed with steel-sheet continuous annealing equipment illustrated in FIGS. 1 to 4. That is, high-tensile steel sheets having a strength of 1,000 MPa, an elongation of 10%, and a hole-expansion ratio of 100% were produced by performing continuous annealing. The conditions of the continuous annealing and material characteristics of the resultant steel sheets after the continuous annealing are summarized in Table 2 below. Note that, in Table 2, TS represents strength (tensile strength), EL represents elongation, and $\lambda$ represents a hole-expansion ratio (indicator of stretch flanging property) measured in accordance with JFS T 1001, which is a standard established by The Japan Iron and Steel Federation (JISF).

As is evident from Table 2, high-tensile steel sheets (Nos. 1a to 3a and 1b to 3b) having good steel-sheet structures and good material characteristics (TS, EL, and $\lambda$) were obtained by performing pre-heating in the pre-heating zone, heating in the heating zone, soaking in the soaking zone, cooling in the cooling zone, subsequent rapid heating at a heating rate of 15° C./s or more in the rapid heating region (rapid heating zone) up to a constant temperature (550° C.), subsequent holding at the constant temperature within 30 seconds, and subsequent rapid cooling at a cooling rate of 10° C./s or more in the rapid cooling region (rapid cooling zone).

In contrast, when the heating rate in the rapid heating region was made less than 15° C./s (10° C./s) instead of the heating rates of Nos. 1a to 3a and 1b to 3b, the number density of cementite grains having a size of 0.1 μm or more increased and, as a result, $\lambda$ decreased to too small values (Nos. 4a and 4b). When the cooling rate in the rapid cooling region was made less than 10° C./s (5° C./s) instead of the cooling rates of Nos. 1a to 3a and 1b to 3b, the number density of cementite grains having a size of 0.1 μm or more increased and, as a result, $\lambda$ decreased to too small values (Nos. 5a and 5b). When the holding time at the constant temperature (550° C.) after the rapid heating (that is, time from the completion of the rapid heating to the initiation of the rapid cooling) was made more than 30 seconds (40 seconds) instead of the holding times of Nos. 1a to 3a and 1b to 3b, the number density of cementite grains having a size of 0.1 μm or more increased and, as a result, λ decreased to too small values (Nos. 6a and 6b).

TABLE 1

| Steel No. | Chemical components (mass %) | | | | | | | | Ac3 point (° C.) |
|---|---|---|---|---|---|---|---|---|---|
| | C | Si | Mn | P | S | N | Al | Another component | |
| A | 0.13 | 1.40 | 2.03 | 0.001 | 0.002 | 0.004 | 0.031 | — | 899 |
| B | 0.18 | 1.36 | 2.02 | 0.001 | 0.002 | 0.004 | 0.030 | Ca: 0.001 | 885 |

The balance is Fe and incidental impurities.

TABLE 2

| | | Conditions in soaking zone | | Cooling conditions in cooling zone*1 | | Rapid heating | High-temperature holding conditions | | Rapid cooling | Structure | | | Number density of cementite grains having size of 0.1 μm or more number/ μm³ | TS Mpa | EL % | λ % |
|---|---|---|---|---|---|---|---|---|---|---|---|---|---|---|---|---|
| No. | Steel type | Temperature ° C. | Time s | Cooling rate ° C./s | Temperature upon completion of cooling ° C. | zone Heating rate ° C./s | Holding temperature ° C. | Holding time s | zone Cooling rate ° C./s | Martensite fraction % | Ferrite fraction % | Other structures % | | | | |
| 1a | A | 920 | 90 | 40 | 100 | 20 | 550 | 5 | 10 | 100 | 0 | 0 | 0.7 | 1011 | 10.8 | 124 |
| 2a | A | 920 | 90 | 40 | 100 | 15 | 550 | 5 | 10 | 100 | 0 | 0 | 1.7 | 1003 | 11.0 | 101 |
| 3a | A | 920 | 90 | 40 | 100 | 20 | 550 | 25 | 10 | 100 | 0 | 0 | 2.0 | 981 | 12.0 | 103 |
| 4a | A | 920 | 90 | 40 | 100 | 10 | 550 | 5 | 10 | 100 | 0 | 0 | 4.2 | 992 | 11.0 | 67 |
| 5a | A | 920 | 90 | 40 | 100 | 20 | 550 | 5 | 5 | 100 | 0 | 0 | 3.8 | 997 | 10.5 | 90 |
| 6a | A | 920 | 90 | 40 | 100 | 20 | 550 | 40 | 10 | 100 | 0 | 0 | 7.2 | 946 | 12.5 | 62 |
| 1b | B | 920 | 90 | 40 | 100 | 20 | 550 | 5 | 10 | 100 | 0 | 0 | 0.5 | 1032 | 12.1 | 123 |
| 2b | B | 920 | 90 | 40 | 100 | 15 | 550 | 5 | 10 | 100 | 0 | 0 | 1.4 | 1009 | 11.8 | 101 |
| 3b | B | 920 | 90 | 40 | 100 | 20 | 550 | 25 | 10 | 100 | 0 | 0 | 1.8 | 992 | 12.3 | 105 |
| 4b | B | 920 | 90 | 40 | 100 | 10 | 550 | 5 | 10 | 100 | 0 | 0 | 3.8 | 983 | 10.5 | 70 |
| 5b | B | 920 | 90 | 40 | 100 | 20 | 550 | 5 | 5 | 100 | 0 | 0 | 4.1 | 995 | 11.2 | 83 |
| 6b | B | 920 | 90 | 40 | 100 | 20 | 550 | 40 | 10 | 100 | 0 | 0 | 6.3 | 962 | 11.0 | 65 |

*1Average cooling rate from heating temperature to 200° C.

Various steel-sheet products ranging from mild steel sheets to ultrahigh-tensile steel sheets can be produced by performing a heat treatment with steel-sheet continuous annealing equipment according to the present invention. A steel-sheet continuous annealing equipment according to the present invention can be suitably used for producing various steel-sheet products ranging from mild steel sheets to ultrahigh-tensile steel sheets by performing a heat treatment and hence is useful.

What is claimed is:

1. Steel-sheet continuous annealing equipment capable of annealing to produce at least mild steel, high-tensile steel and ultrahigh-tensile steel, comprising, in sequence, a plurality of enclosures defining a pre-heating zone, a heating zone, a soaking zone, a cooling zone, a reheating zone, an overaging zone, and a final cooling zone, wherein said pre-heating zone, heating zone, soaking zone, cooling zone, reheating zone, overaging zone, and final cooling zone are capable of temperatures for annealing sheet steel to produce at least mild steel and high-tensile steel, and further comprising a rapid heating region and a rapid cooling region provided in said plurality of enclosures within a range from the reheating zone to the final cooling zone, wherein for annealing to produce ultrahigh-tensile steel, the rapid heating region provides selective rapid heating of a steel sheet at a heating rate of 15° C./s or more and the rapid cooling region provides selective rapid cooling, at a cooling rate of 10° C./s or more, of the steel sheet that has been rapidly heated in the rapid heating region, wherein for providing selective rapid heating, the rapid heating region includes a plurality of heating units whose heating capabilities are independently controllable, and wherein for providing selective rapid cooling, the rapid cooling region includes a plurality of cooling units whose cooling capabilities are independently controllable.

2. The steel-sheet continuous annealing equipment according to claim 1, wherein the rapid heating region is provided in the overaging zone and the rapid cooling region is provided between the overaging zone and the final cooling zone or in the final cooling zone.

3. The steel-sheet continuous annealing equipment according to claim 1, wherein the rapid heating region is provided in the reheating zone and the rapid cooling region is provided between the reheating zone and the overaging zone.

4. The steel-sheet continuous annealing equipment according to claim 1, wherein both the rapid heating region and the rapid cooling region are provided in the overaging zone.

5. The steel-sheet continuous annealing equipment according to claim 1, further comprising sensors for measuring temperatures of the steel sheet before and after the rapid heating region and after the rapid cooling in the rapid cooling region.

6. The steel-sheet continuous annealing equipment according to claim 1, wherein the heating units in the rapid heating region include an induction heater or heating means configured to conduct indirect heating.

7. The steel-sheet continuous annealing equipment according to claim 1, wherein the cooling units in the rapid cooling region include a gas-jet cooling device configured to cool the steel sheet by blowing cooling gas on the steel sheet through a nozzle.

8. The steel-sheet continuous annealing equipment according to claim 7, wherein the cooling gas comprises a gas mixture containing nitrogen and hydrogen and having a hydrogen concentration of 5 to 75 vol %.

9. The steel-sheet continuous annealing equipment according to claim 1, wherein the rapid heating region and the rapid cooling region are connected to each other through a duct in which a fan is disposed in an intermediate portion of the duct so as to allow exchange of atmosphere gases.

10. The steel-sheet continuous annealing equipment according to claim 1, wherein the pre-heating zone, the heating zone, the soaking zone, the reheating zone, and the overaging zone are capable of heating independently of the selective rapid heating, and wherein the cooling zone and the final cooling zone are capable of cooling independently of the selective rapid cooling.

* * * * *